UNITED STATES PATENT OFFICE.

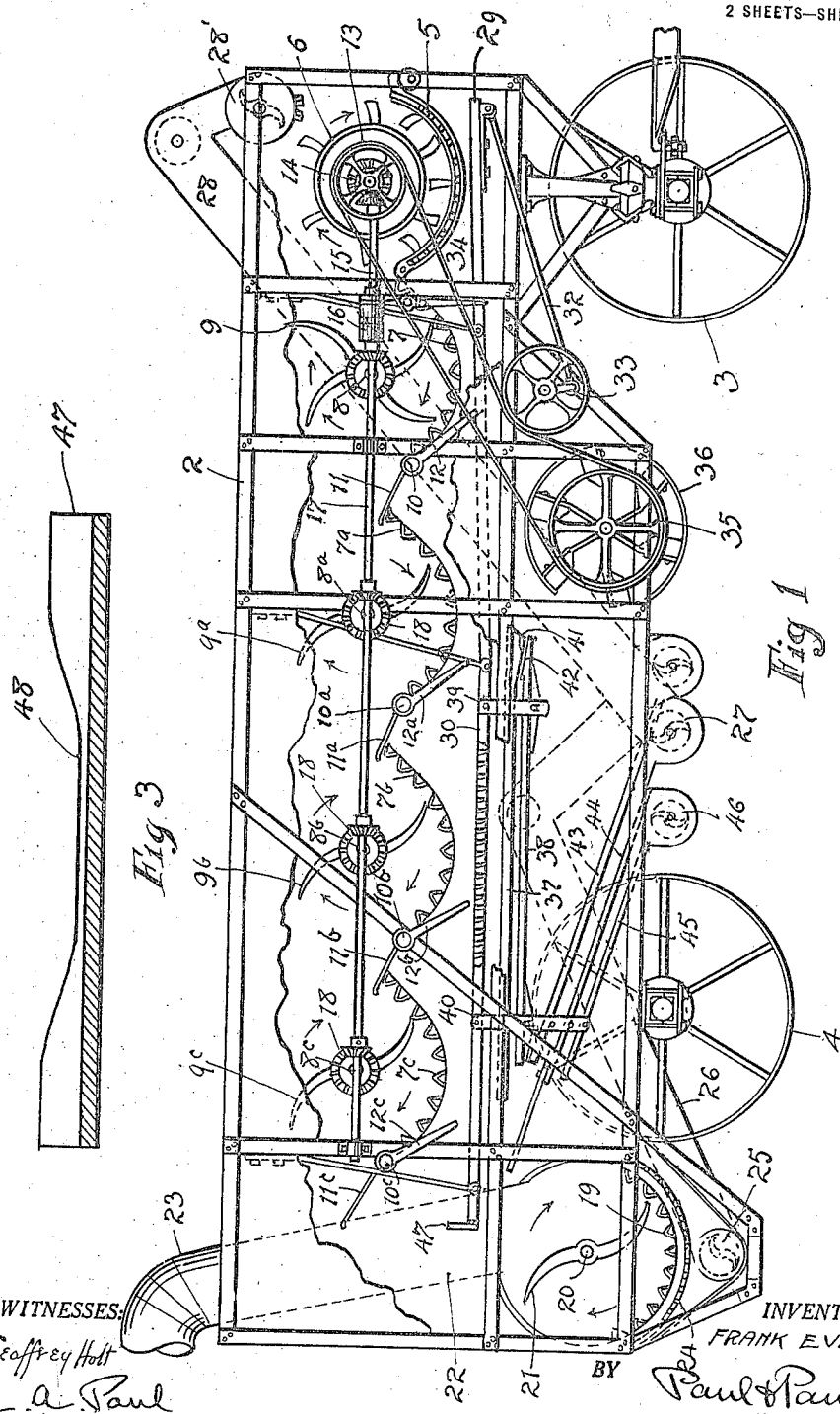

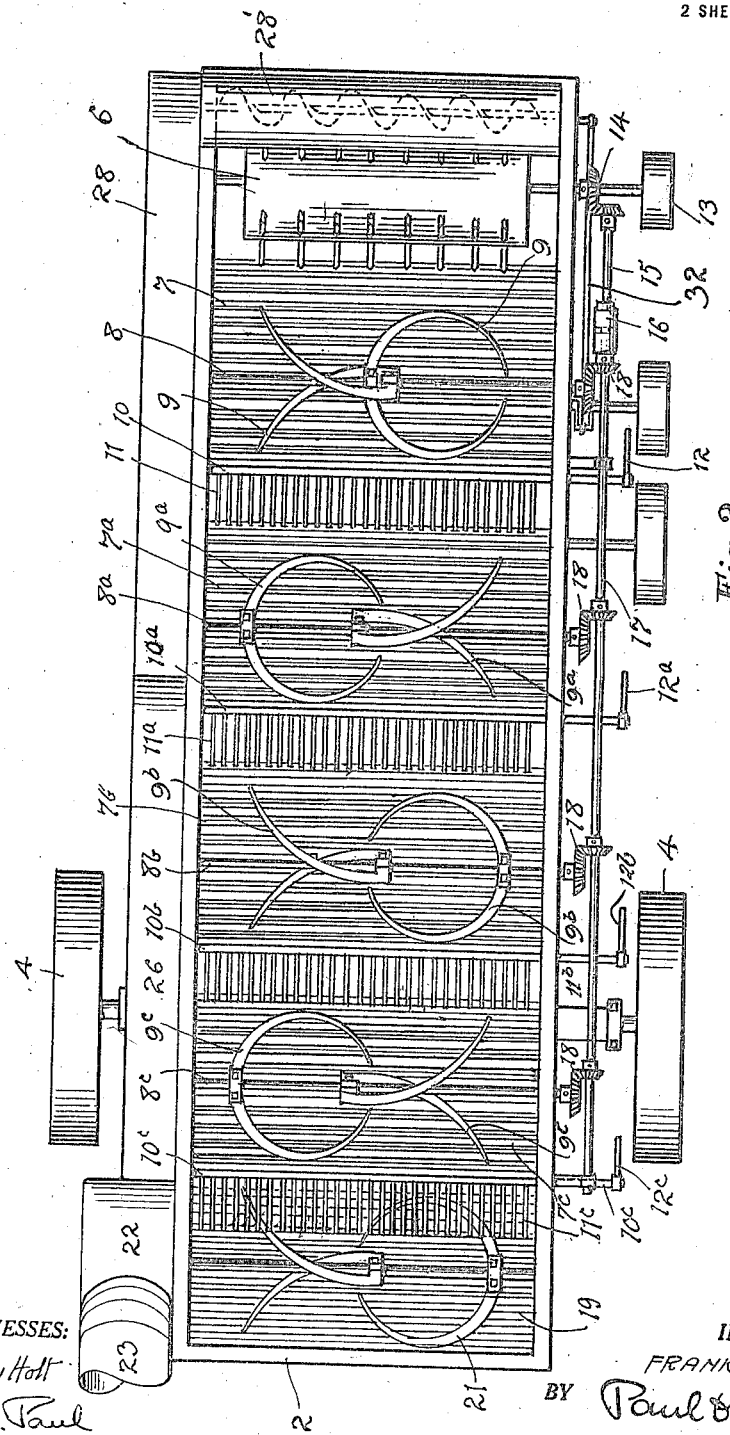

FRANK EVES, OF DEVILS LAKE, NORTH DAKOTA.

THRESHING-MACHINE.

1,301,671.  Specification of Letters Patent.  Patented Apr. 22, 1919.

Application filed September 22, 1916. Serial No. 121,650.

*To all whom it may concern:*

Be it known that I, FRANK EVES, a citizen of the United States, resident of Devils Lake, county of Ramsey, State of North Dakota, have invented certain new and useful Improvements in Threshing-Machines, of which the following is a specification.

The object of my invention is to provide a threshing machine having a much longer threshing surface or area than usual in machines of this type to the end that a much larger proportion of the grain which usually is carried out with the straw to the stack and lost will be saved.

A further object is to provide a threshing machine of compact, durable construction and one which will be comparatively inexpensive to operate and maintain.

Other objects of the invention will appear from the following detailed description.

The invention consists generally in various constructions and combinations, all as hereinafter described and particularly pointed out in the claims.

In the accompanying drawings forming part of this specification,

Figure 1 is a side elevation of a threshing machine embodying my invention, with the casing broken away to show the construction of the machine, Fig. 2 is a plan view of the same, Fig. 3 is a detail sectional view of the tail board at the rear end of the chaffer.

In the drawing, 2 represents the frame of the machine, made preferably of angle bar material on account of its strength and rigidity. 3 and 4 are the forward and rear carrying wheels of the machine. 5 is the threshing cylinder concave and 6 the threshing cylinder. In the rear of this cylinder is a concave 7 and a transverse shaft 8 on which beater arms 9 are mounted in pairs. These arms have hubs secured to the shaft, preferably near the middle portion thereof, and the arms project in opposite directions toward the sides of the machine. The arms are preferably twisted, as indicated in the drawing, and when the shaft is revolved the straw delivered to the concave 7 is beaten and whipped by these arms and thrown in opposite directions of the concave. A shaft 10 is provided near the rear edge of the concave 7 and in this shaft a series of arms 11 are mounted. These arms extend lengthwise of the machine and overhang the receiving edge of a second concave $7^a$ and the shaft 10 is provided with a lever 12 by means of which the shaft may be rocked to change the angle of the arms with respect to the concaves. The shaft $8^a$ is mounted above the concave $7^a$ and upon this shaft beater arms $9^a$ are secured in pairs. These arms correspond substantially to those on the shaft 8 except that they are differently arranged, being mounted so that the arms extend in the same direction and operate to throw the grain toward one side of the machine. A shaft $10^a$ is provided, having arms $11^a$ and an operating lever $12^a$, said arms overhanging a third concave $7^b$. A shaft $8^b$ is mounted above this last described concave with arms secured thereon extending in the opposite direction from the arms on the shaft $8^a$ and operating to throw the straw toward the other side of the machine. A fourth concave and beater arms are provided, having the same function as those described, and which I will designate by the same reference numerals with the addition of the exponent "c". These beaters all operate in substantially the same manner to beat and whip the straw and throw it back and forth from side to side of the machine, at the same time advancing it lengthwise through the machine.

The cylinder shaft has a drive pulley 13 geared at 14 to a shaft 15 which has a coupling 16 connecting it with a shaft 17 from which the beater shafts are all driven through gears 18. At the rear end of the machine a concave 19 is provided with a shaft 20 mounted above it on which arms 21 are secured in pairs below the level of the beater shafts and concaves, above described. These beater arms 21 operate to throw the straw into the trunk 22 of the stacker tube 23 and arms $11^c$ are mounted in the manner described with reference to the other arms between the grates for directing the straw from the grate $7^c$ into the path of the beaters 21.

Beneath the concave 19 is a curved perforated plate 24 through which the grain passed out of the straw by the operation of the beater arms is discharged into a screw conveyer 25 which operates transversely of the machine and delivers the grain to an auxiliary elevator 26 from whence it is discharged into the boot 27 of the elevator 28 for delivery to the screw conveyer 28' and the threshing cylinder. In this way a large percentage of the grain which usually has passed out of the machine with the straw is separated from the straw and saved.

Beneath the threshing cylinder is a grain pan 29 to the rear end of which a chaffer 30 is connected, said pan and chaffer being supported by a series of spring straps or hangers 31 and a vibrating movement is imparted to this grain pan and chaffer through the pitman rod 32 connecting said pan with a crank on the pulley 33. A belt 34 drives this pulley from the cylinder shaft and also drives a pulley 35 on the shaft of the blast fan 36.

Beneath the chaffer are sieves 37 and 38 suspended on links 39 and 40. These sieves have inclined surfaces 41 and 42 formed thereon which, when the sieves are vibrated through the longitudinal movement of the chaffer, contact with one another and cause the sieves to jump and agitate the material thereon. This has the effect of keeping the meshes of the screen clean as they alternately sweep the rubbish from their opposing faces.

The links 40 depend below the sieves 37 and 38 and support a gang of sieves 43, 44 and 45. The sieve 43 directs the seed from the sieves 37 and 38 to the elevator boot 27 and the sieve 44 receives the tailings from the sieves 37 and 38 and the sieve 45 receives the waste material that is discharged into the transverse conveyer 46 for delivery outside the machine. The manner of mounting and operating these sieves I regard as an important feature of the machine.

At the rear end of the chaffer is a plate 47 having a depression or recess 48 in its upper edge through which the tailings of the chaffer are discharged upon the grate 19 into the path of the beater arms 21. The fan 36 is positioned to direct blasts of air under and through the chaffer for blowing the light refuse material back under the transverse grates into the path of the rear beater arms, to be directed thereby into the stacker.

In the operation of the machine, the straw is fed to the threshing cylinder and from thence passes to the first group of whipping arms to be beaten and thrown in opposite directions toward the sides of the machine. From the first group of beater arms the straw passes to the second group, which operates to throw it toward one side of the machine. The third group receives and throws it in the opposite direction and so on through the machine, the straw being alternately thrown from side to side and thoroughly whipped and beaten during its passage until the grain is entirely shaken out. A transverse movement of the straw from side to side in the machine greatly increases its travel and multiplies the beating process.

It will be understood, of course, that by varying the length of the machine casing the number of groups of whipping arms may be increased or diminished, as desired.

I claim as my invention:

1. In a threshing machine, a plurality of transversely mounted concaves, arms mounted in groups above said concaves and extending lengthwise thereof, the arms of one group operating to beat and feed the straw toward one side of the machine and the arms of the adjacent group operating to beat and feed the straw toward the opposite side of the machine.

2. In a threshing machine, a plurality of concaves, arranged transversely in series lengthwise of the machine, a cylinder mounted to deliver the straw to the first of said series, beaters mounted above said concaves and operating to move the straw lengthwise of said concaves, and from one concave to the adjacent one, and arms arranged between said concaves and over which the straw is delivered from one concave to another.

3. In a threshing machine, a plurality of transversely arranged concaves and tilting arms disposed between said concaves and over which the straw passes from one concave to the next one, a corresponding number of groups of beater arms mounted above said concaves and operating to beat and feed the straw back and forth from side to side of the machine and lengthwise thereof.

4. In a threshing machine, transverse concaves arranged in series in parallel relation, a threshing cylinder for delivering the straw to the first of the series of concaves, a concave at the discharge end of the machine below the level of the other concaves, beaters mounted above said concaves and operating to move the straw from side to side of the machine, and from one concave to the other, and a stacker tube communicating with said last concave of the series.

5. In a threshing machine, transverse concaves arranged in series, beater arms mounted above said concaves for beating and whipping the straw and throwing it from one concave to another, shafts mounted transversely of the machine between said concaves, arms carried by said shafts transversely of said concaves and over which arms the straw is directed from one concave to another, and means for rocking said shafts to tilt said arms.

6. In a threshing machine, the combination, with a series of transversely arranged concaves on substantially the same level and in parallel relation, shafts mounted above said concaves, beater arms mounted on said shafts for beating and whipping the straw and throwing it from one concave to the other, a concave provided near the discharge of the machine below the level of the other concaves, beater arms mounted above said lower level concave, and a screw conveyer operating below said lower level concave.

7. In a threshing machine, a plurality of concaves arranged transversely in series lengthwise of the machine, beater shafts mounted above said concaves respectively, beater arms secured on said shafts, said arms being arranged in pairs, the arms of the first concave having their hubs mounted on the middle portion of the shaft of that concave and projecting therefrom toward the sides of the machine, said arms being curved to beat and whip the straw outwardly on the concave, the arms of the remaining concaves being mounted on the middle and end portions of their shafts respectively, and those of the same concave extending in the same direction and oppositely arranged with respect to the arms of the adjacent succeeding concave, whereby a movement laterally of the machine will be imparted to the straw in addition to its lengthwise movement thereof.

8. In a threshing machine, a plurality of concaves arranged transversely in series lengthwise of the machine, a cylinder mounted to deliver the straw to the first of said series, shafts mounted in the machine frame above said concaves respectively, beater arms mounted on said shafts and arranged in pairs extending lengthwise of the concaves and transversely of the machine, the arms of the adjoining concaves being reversely arranged for imparting a movement to the straw transversely of the machine as well as lengthwise thereof.

9. In a threshing machine, a plurality of concaves arranged transversely in series lengthwise of the machine, a cylinder mounted to deliver the straw to the first of said series, shafts mounted in the machine above said concaves respectively, beater arms mounted on said shafts and arranged in pairs extending lengthwise of the concaves and transversely of the machine, the arms of the adjoining concaves being reversely arranged for imparting a movement to the straw transversely of the machine as well as lengthwise thereof, and means between the concaves for guiding the straw from each concave to the next succeeding one.

10. In a threshing machine, transverse concaves arranged in series in parallel relation, a chaffer mounted below said concaves, a concave mounted beneath the discharge end of said chaffer, the end board for said chaffer having a recessed upper edge through which the tailings of the chaffer are discharged, and beaters mounted above said concaves.

In witness whereof, I have hereunto set my hand this 29" day of June, 1916.

FRANK EVES.

Copies of this patent may be obtained for five cents each, by addressing the "Commissioner of Patents, Washington, D. C."